United States Patent [19]

Stein

[11] Patent Number: 4,574,605
[45] Date of Patent: Mar. 11, 1986

[54] FORMING MACHINE WITH MULTIPLE WORK STATIONS

[75] Inventor: Ronald R. Stein, Sterling Heights, Mich.

[73] Assignee: Ex-Cell-O Corporation, Troy, Mich.

[21] Appl. No.: 645,372

[22] Filed: Aug. 29, 1984

[51] Int. Cl.$^4$ ............................................. B21D 17/04
[52] U.S. Cl. ........................................ 72/88; 72/422; 72/469; 269/186
[58] Field of Search ...................... 269/186; 72/88, 90, 72/421, 422, 469

[56] References Cited

U.S. PATENT DOCUMENTS 3,165,766  1/1965  Wisebaker ............................ 72/422

FOREIGN PATENT DOCUMENTS 660760  5/1979  U.S.S.R. ................................ 72/88

Primary Examiner—W. D. Bray
Attorney, Agent, or Firm—Edward J. Timmer

[57] ABSTRACT

The forming machine includes a load station adjacent one end, an unload station adjacent the other end and a first work station, turnaround station and second work station spaced longitudinally in succession between the load and unload stations along a workpart flow path. Each work station includes a rotatable spindle fixed in position on one side of the flow path and a tailstock with a workpart support slidable toward the spindle transversely of the flow path. An overhead transfer mechanism is slidable along the flow path and carries multiple workpart transfer members such as grippers to transfer workparts successively from one station to the other along the flow path. First and second pairs of forming tools are spaced longitudinally to cooperate with the first and second work stations and are slidable longitudinally and simultaneously in engagement with first and second workparts rotatably and transversely supported at the respective work stations between the respective spindle and tailstock. The turnaround station is operable to permit opposite ends of a workpart such as a solid shaft to be formed by the forming tools.

12 Claims, 5 Drawing Figures

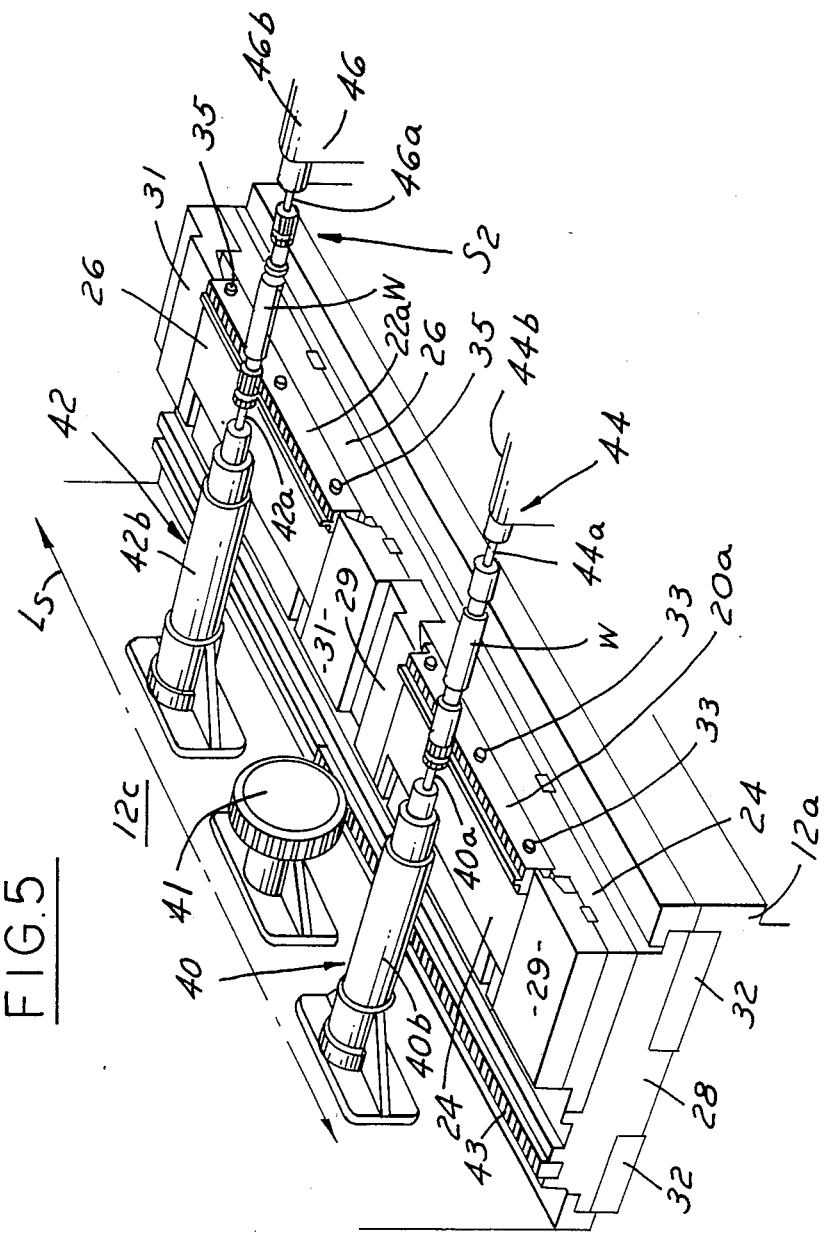

FORMING MACHINE WITH MULTIPLE WORK STATIONS

FIELD OF THE INVENTION

The present invention relates to machines for roll forming workparts using pairs of sliding tools or racks in pressure engagement with workparts rotatably supported therebetween.

BACKGROUND OF THE INVENTION

The Drader U.S. Pat. No. 3,015,243 issued June 2, 1962 discloses a machine for splining a cylindrical solid shaft wherein the shaft is rotatably supported on a single headstock and tailstock and first and second sliding tooth-forming racks are slid past opposite sides of the shaft in pressure contact therewith to roll form toothed elements in the shaft periphery.

Other patents illustrating similar roll forming machines are McCardell's U.S. Pat. No. 3,062,077 issued Nov. 6, 1962; U.S. Pat. No. 3,115,052 issued Dec. 24, 1963; U.S. Pat. No. 3,183,697 issued May 18, 1965; U.S. Pat. No. 3,267,582 issued Aug. 23, 1966; and U.S. Pat. No. 3,566,652 issued Mar. 2, 1971.

Other patents relating to similar roll forming machines include Miller's U.S. Pat. No. 3,827,280 issued Aug. 6, 1974; U.S. Pat. No. 3,857,273 issued Dec. 31, 1974; and U.S. Pat. No. 3,902,349 issued Sept. 2, 1975.

Roll forming machines using a pair of sliding tooth-forming racks in combination with a rotatable toothed mandrel to develop a tooth form in the periphery of an annular or tubular workpiece are illustrated in the following: McCardell U.S. Pat. No. 3,214,751 issued Nov. 2, 1965; Killop U.S. Pat. No. 3,982,415 issued Sept. 28, 1978; Killop U.S. Pat. No. 4,028,922 issued June 14, 1977; Jungesjo U.S. Pat. No. 4,155,237 issued May 22, 1979; and Hooker U.S. Pat. No. 1,510,889 issued Oct. 7, 1924.

SUMMARY OF THE INVENTION

The invention contemplates a machine for forming splines, gear teeth, serrations, grooves or other features in the periphery of a workpart comprising a first work station for rotatably supporting a first workpart, second work station for rotatably supporting a second workpart with the work stations spaced apart in a direction, e.g. longitudinally, on the machine base, first and second pairs of spaced, facing forming tools spaced apart in the same direction to cooperate with the respective first and second work stations to roll form respective first and second workparts thereat and slidable simultaneously in the direction in pressure engagement with the respective first and second rotatably supported workparts at the first and second work stations, means for simultaneously sliding the first and second pairs of forming tools and means for positioning workparts at the first and second work stations.

In a preferred embodiment, at least one of the work station spindles, work station tailstocks and workpart positioning means is moveable transversely to position the first and second workparts between the respective pairs of facing forming tools at the work stations. In another preferred embodiment, the workpart positioning means is movable in increments to move workparts in succession from a load station to a first work station, to a second work station and then to an unload station.

In a typical working embodiment of the invention, the machine includes a workpart load station at one end, a workpart unload station at the other end and a first work station, turnaround station for reorienting a workpart, and a second work station spaced apart in a longitudinal direction and in succession along a workpart flow path between the ends. An overhead workpart transfer means having multiple transfer members is movable by a compound slide assembly in longitudinal reciprocating increments or strokes along the workpart flow path and movable vertically relative to the load station, work station, turnaround station, second work station and unload station to transfer workparts in succession from one station to another along the flow path. The tailstock at each work station is carried on a transverse slide and includes a workpart support on which a workpart is deposited by the overhead transfer member. The workpart is carried to the respective spindle by transverse tailstock slide movement. The tailstock and spindle lift the workpart from the support by cam action at conical or other cam-like ends thereof and rotatably support the workpart transversely therebetween.

Preferably, the load station, first tailstock, turnaround station, second tailstock and unload station are in a general longitudinal path or line when workparts are not being roll formed and the overhead transfer means is movable longitudinally therealong in increments or strokes to transfer workparts in succession from one to the other. The first and second spindles are preferably fixed in a general longitudinal path or line which is spaced in generally parallel relation to the aforementioned longitudinal path or line with the forming tools being slidable longitudinally therebetween. When a workpart is deposited on the workpart support of the first and second tailstocks, the tailstocks are slid transversely toward the respective spindles to rotatably support the workpart between the respective pairs of forming tools for cold forming thereby and then slid away from the spindle after forming to the original longitudinally aligned position so that the workpart transfer means can transfer the formed workpart to the next station.

The turnaround station of the machine permits reorientation of workparts so that opposite ends thereof can be formed by the respective first and second pairs of forming tools at the respective first and second work stations.

The machine of the invention permits high production rates of splined, serrated, grooved, threaded, roll sized and other form workparts.

BRIEF DESCRIPTION OF THE DRAWINGS

FIG. 5 is a partial perspective view showing workparts rotatably supported at first and second work sections with only the lower forming tools shown.

DESCRIPTION OF PREFERRED EMBODIMENTS

Figure 1:
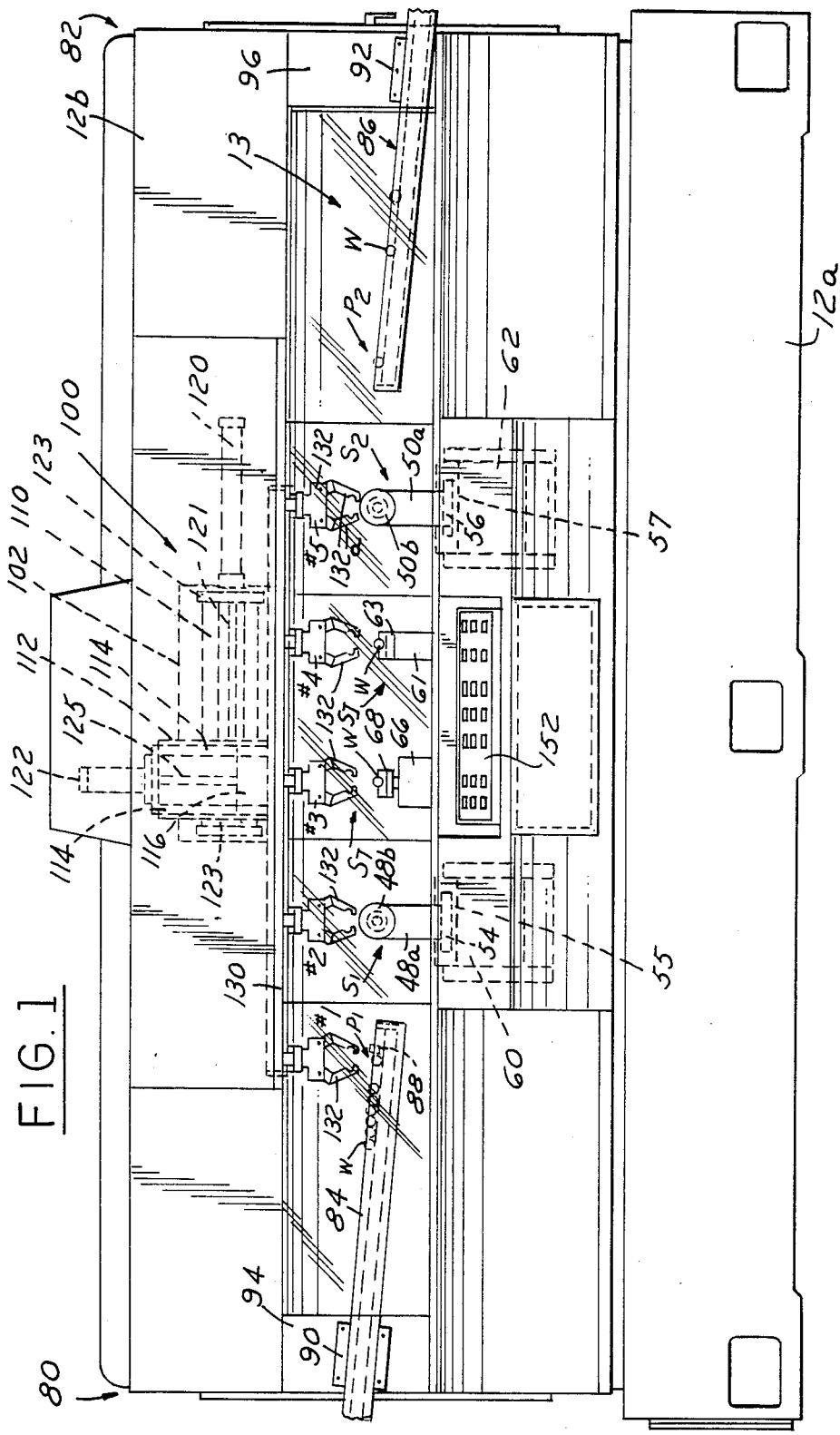
FIG. 1 is a front elevation of the machine of the invention.
Figure 2:
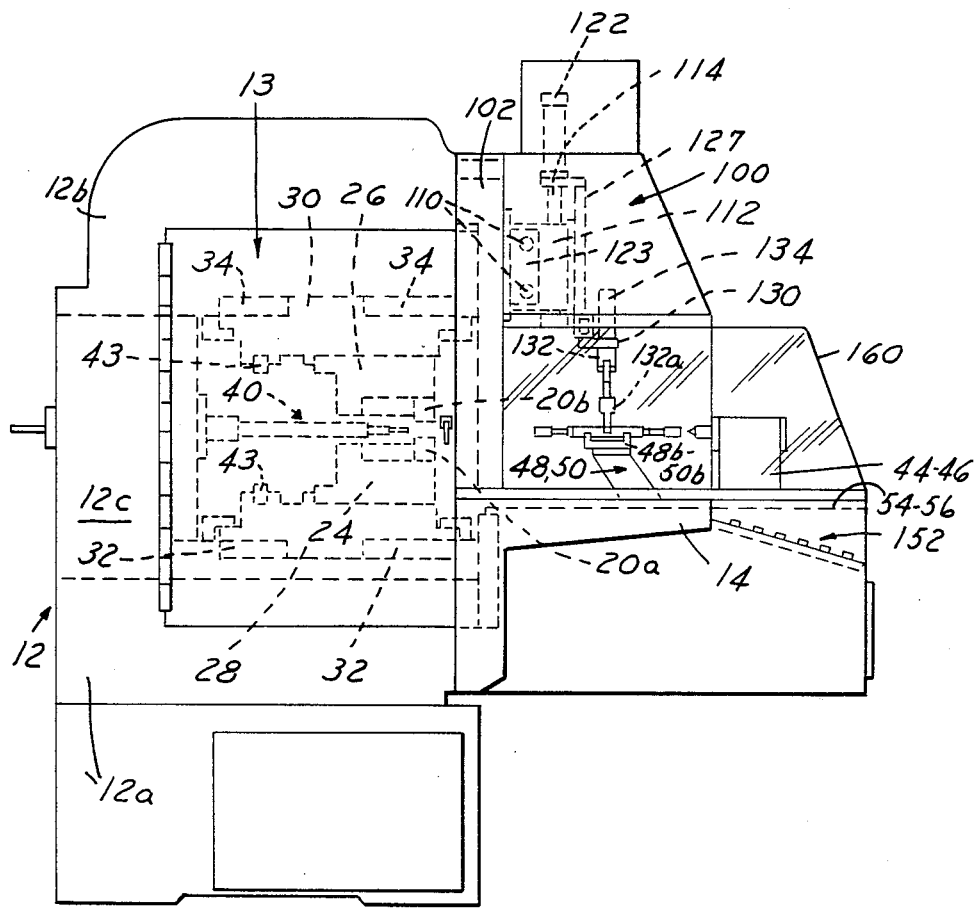
FIG. 2 is a side elevation thereof.
Figure 3:
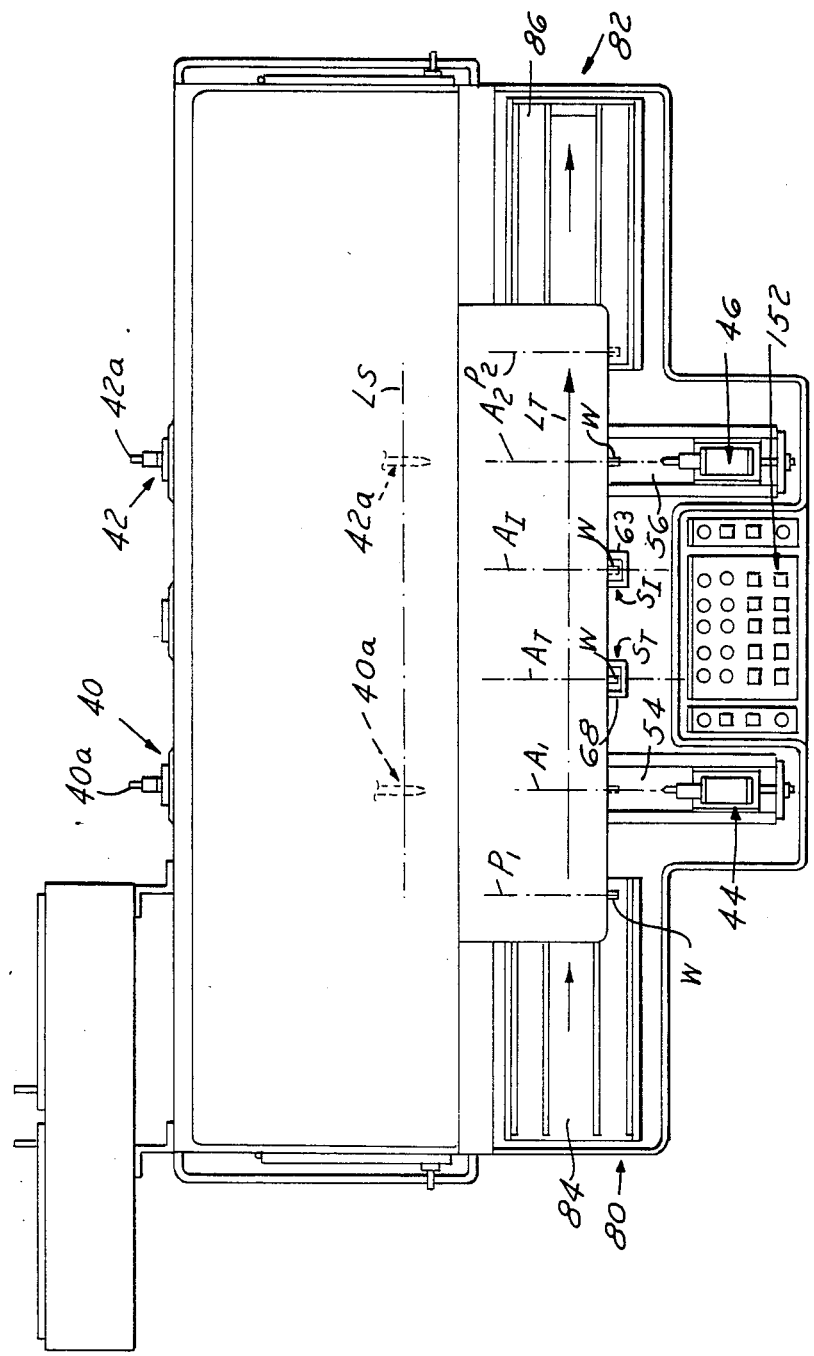
FIG. 3 is a plan view of the machine without the workpart transfer mechanism.

An exemplary roll forming machine of the invention is illustrated in FIGS. 1-5. The machine includes a headstock or spindle support frame 12 having a lower base 12a and upper base 12b connected by column 12c and further includes a tailstock support frame 14 fixedly mounted in cantilever fashion on the base 12b as shown in FIG. 2. The lower base 12a and upper base 12 are preferably of a heavy, rigid construction and define a longitudinal throat or channel 13 running along the length of the machine. In order to increase the rigidity of the machine, tie bars 16 and 18 are provided and fastened as by bolts to the upper and lower bases 12a, 12b.

Figure 4:
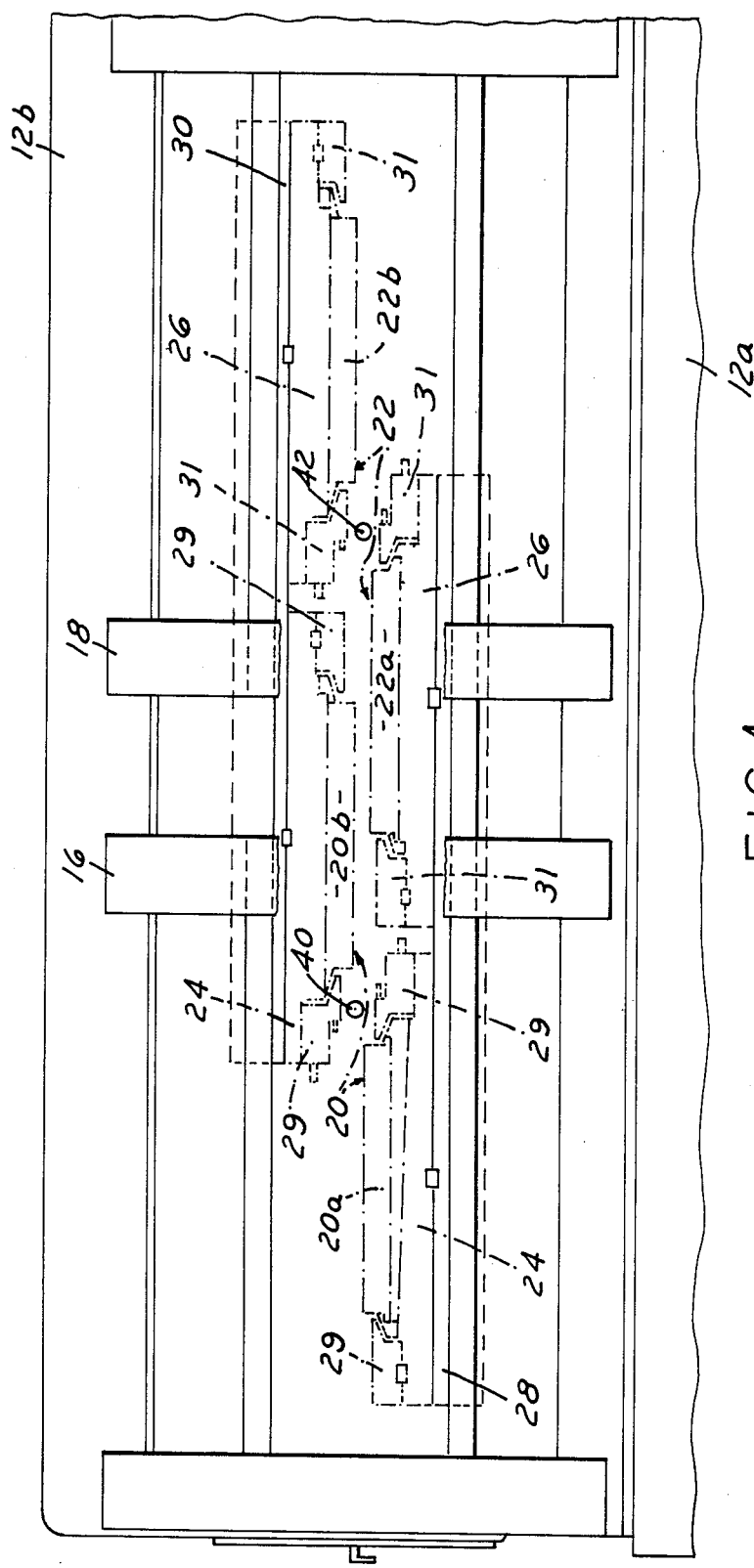
FIG. 4 is a front elevation of the forming racks and slides therefor.

Referring to FIGS. 2, 4 and 5, first and second pairs of forming racks or tools 20,22 are fixedly attached in spaced apart relation in a longitudinal direction to tool holder plates 24,26 which in turn are mounted on lower and upper common slides 28,30, respectively. End clamps 29,31 and multiple bolts 33,35 hold the tool pairs 20,22, respectively, to the tool holder plates 24,26. The slides 28,30 are slidably mounted on slideways 32,34 themselves fixedly supported on lower base 12a. As is apparent, each pair 20,22 of forming racks or tools includes spaced, facing lower and upper forming tools 20a,20b and 22a,22b. The forming tools shown in FIG. 5 are configured to roll form splines and a groove simultaneously on the workpart shaft ends as shown. The forming tools or racks 20,22 may have known transversely extending tooth forms on the spaced facing working surfaces to form splines or gear teeth or other working surface features to form serrations, grooves, roll sized diameters and the like depending upon the particular application, as is well known.

The slides 28,30 are driven to slide simultaneously and longitudinally toward and away from one another by a suitable drive mechanism (not shown) for example of the hydraulic piston and cylinder type described in the McCardell U.S. Pat. Nos. 3,015,243 and 3,214,951, the teachings of which are incorporated herein by reference. In particular, the piston and cylinder assemblies are substantially identical in size and are interconnected to a common source of fluid pressure with a control valve interposed between the hydraulic assemblies and the common fluid pressure source to simultaneously actuate and control both assemblies. The hydraulic assemblies bias the slides 28,30 concurrently at the same velocity in the longitudinal direction but in opposite senses (leftward and rightward in FIG. 4) at the same velocity due to the interlocking effect of the hydraulic pressure on the assemblies. It is apparent that the upper rack of each tool pair 20,22 is slid in the same longitudinal direction (leftward in FIG. 4) while the lower rack of each pair is slid in the same longitudinal direction but in the opposite sense (rightward in FIG. 4). Of course, other known slide drive means may be employed to effect simultaneous longitudinal sliding of slides 28,30 and tool pairs 20,22 carried thereon. A synchronizing gear 41 is rotatably mounted on column 12c and meshes with a synchronizing rack 43 fixedly attached on each of the slides 28,30 to insure synchronized movement thereof.

Positioned behind the racks 20,22 and slides 28,30 are first and second spindles or headstocks 40,42, FIGS. 2 and 4. Each spindle includes a conical end spindle shaft 40a,42a rotably mounted in spindle housing 40b,42b attached to column 12c for purposes to be described. It is apparent that the spindle shaft rotational axis is aligned generally in the transverse or perpendicular direction in the longitudinal channel 13 and rack movement and that the spindles 41,42 are spaced apart in the longitudinal direction in channel 13 along a longitudinal path or line $L_S$. It is also apparent that the synchronizing gear 41 is located longitudinally between the spindles 40,42.

Positioned on the front side of the racks 20,22 and slides 28,50 on the tailstock support frame 14 are first and second tailstocks 44,46 including workpart supports 48,50 associated with the tailstocks. The tailstock 44 and associated support 48 are mounted on a common slide 54, slidable in the transverse direction relative to the longitudinal channel 13, tool movement and path $L_S$. Similarly, the tailstock 46 and associated support 50 are mounted on a common slide 56 transversely slidable relative to channel 13 and rack movement. Slides 54,56 are slidable on transverse slideways 55,57.

Each tailstock 44,46 includes a conical end shaft 44a,46a rotatably mounted in tailstock housing 44b,46b and having a rotational axis substantially coaxial with that of the spaced facing spindle shaft 40a,42a. Each workpart support 48,50 includes a pedestal 48a,50a which carries an elongate support member 48b,50b having a U-shaped notch in the upper surface to receive and cradle a shaft workpart W. As is apparent, the workpart shaft longitudinal axis is in the transverse direction relative to the channel 13 and rack movement when carried on supports 48,50.

Tailstock and workpart support slides 54,56 are slid toward and away from the respective first and second spindles 40,42 by means of conventional hydraulic cylinders mounted on the frame 14 and schematically shown as 60,62.

Together, the spindle 40 and tailstock 44 with workpart support 48 comprise a first work station $S_1$ while spindle 42 and tailstock 46 with workpart support 50 comprise a second work station $S_2$ spaced apart in the longitudinal direction from the first station $S_1$ along a longitudinal path or line $L_T$, the rotational axes of the spindle and tailstock shafts being generally transverse or perpendicular to the longitudinal path or lines $L_S$ and $L_T$ which are generally parallel.

Positioned in line between the tailstocks 44,46 on the front side of the machine are an idle station $S_I$ comprised of a pedestal 61 fixed to lower base 12a and workpart support 63 similar to those described above for workpart support 48 or 50 (i.e., having an elongated transverse U-notch in the top thereof) and a turnaround station $S_T$ comprising a base 66 rotatably mounted on lower base 12a, a workpart support member 68 mounted on base 66 for rotation therewith and similar to those described above for workpart supports 48 or 58. A suitable conventional indexer 72 (shown schematically) rotates the base 76 and workpart support member 68 in 180° increments for purposes to be described.

Adjacent opposite ends 80,82 of the machine are positioned an inclined workpart load chute 84 and inclined workpart discharge or unload chute 86, both extending generally longitudinally through the channel 13. Multiple workparts are carried in load chut 84 and held in position by a suitable stop 88 at a pick-up position $P_1$ constituting a load station. Workparts which have been pressure formed are transferred to discharge position $P_2$ on discharge chute 86 constituting an unload station and placed in chute 86. Chutes 84,86 are fastened by brackets 90,92 to the end columns 94,96 connecting the lower and upper base 12a,12b.

It is apparent from FIG. 1, that the transverse axis of pick-up position $P_1$ of load chute 84, tailstock axis $A_1$ of the first work station $S_1$, axis $A_T$ of turnaround station $S_T$, axis $A_I$ of idle station $S_I$, tailstock axis $A_2$ of the second work station $S_2$ and transverse axis of discharge position $P_2$ of discharge chute 86 are spaced apart in the longitudinal direction and in succession along line $L_T$ across the front side of the machine and together define a workpart flow path in the general longitudinal direction across the machine from end 80 to end 82.

Workparts are transferred along the workpart flow path by an overhead transfer mechanism 100 mounted on a depending support member 102 attached fixedly to the front of the upper base 12b as shown best in FIG. 2. The overhead transfer mechanism 100 is cantilevered from the member 102 and includes a pair of longitudinally extending spaced, parallel slide bars 110 and a slide 112 slidably mounted thereon for longitudinal movement. A transverse or vertical slide 116 is slidably mounted on a pair of spaced parallel transversely or vertically extending slide bars 114.

Longitudinal slide 112 is caused to reciprocate longitudinally by a suitable hydraulic cylinder 120 and piston 121 mounted on support plates 123 attached to support member 102 while transverse slide 116 is caused to move vertically by hydraulic cylinder 122 and piston 125 mounted by bracket 127 on slide 112. Of course, other known compound slide mechanisms can be used for the slide mechanism.

The transverse vertically movable slide 116 carries and has attached fixedly thereto a longitudinal member 130 for movement therewith and spaced longitudinally apart along the longitudinal member 130 are workpart grippers 132 each having pairs of facing tongs 132a adapted to close on and releasably grip a cylindrical workpart shaft W. The grippers 132 are actuated to open and close by their own individual hydraulic cylinders 134 carried on the member 130. As is apparent from FIG. 1, the grippers 132 are spaced apart in the longitudinal direction by a distance coinciding with the longitudinal spacing between pick-up position $P_1$ at load chute 84, the U-shaped notches of the workpart support members 48,50,63 and 68 and discharge position $P_2$ at the discharge chute 86. It is also apparent that the grippers 132 are moved longitudinally in unison by the longitudinal member when the latter is slid or stroked by longitudinal slide 112 and cylinder 120 and vertically in unison when transverse slide 116 is stroked by cylinder 122. The reciprocating stroke of cylinder 120 rightward and leftward relative to FIG. 1 will be substantially equal to the longitudinal spacing between pick-up position $P_1$, the U-shaped notches of workpart supports 48,50,63 and 68, and discharge position $P_2$ as is apparent from FIG. 1.

In one mode of operation for roll forming first and second opposite ends of the workpart shafts W, a workpart W is picked up by gripper 132-#1 at pick-up position $P_1$ and deposited on workpart support 48 by one stroke of cylinder 120 to the right from the pick-up position $P_1$ and by the necessary vertical movements of the longitudinal member 130 and opening and closing of grippers 132 by cylinders 122 and 134, respectively. Then, the tailstock and workpart slide 54 can be slid toward the first spindle 40. As the tailstock approaches the spindle, the conical shaft ends 40a,44a center themselves in similar shaped counterbores in the ends of the workpart to cam the workpart out of the U-shaped groove on the support member to rotatably support the workpart therebetween with the inner end in position for engagement by racks 20,22 as they are slid therepast in pressure engagement therewith. The upper rack of each pair slides in the ssme longitudinal direction and the lower rack of each pair slides in the same longitudinal direction but with the lower racks sliding in the opposite sense from the upper racks, i.e., rightward longitudinally for the lower racks and longitudinally leftward for the upper racks related to FIG. 4. After forming the inner end of the workpart shaft, the tailstock slide 54 is returned to its forward position on the front side of the machine. The workpart with the inner formed end drops back into the U-shaped notch of the support member on the tailstock slide 54 as the slide is moved away from the spindle 40. In the meantime, the grippers have been returned to the position shown in FIG. 1 by one stroke of cylinder 120 to the left relative to that Figure and forming tools 20,22 are placed at their original starting position. After the tailstock of work station $S_1$ is returned to the forward position, a second workpart in chute 84 is picked up at position $P_1$ by gripper 132-#1 and at the same time gripper 132-#2 picks up the first workpart at work station $S_1$. A rightward stroke of cylinder 120 will then cause slide 112 and longitudinal member 130 to move in unison the first workpart to the turnaround station $S_T$ and the second workpart to work station $S_1$. At the turnaround station $S_T$, the first workpart is rotated 180° to place the unformed end toward the back side of the machine for subsequent forming in work station $S_2$ by forming tools 22. At work station $S_1$, the sequence described above for forming the inner end of the first workpart is thereafter repeated to form the inner end of the second workpart shaft. As will be apparent, the stroking sequence of longitudinal slide 112 and vertical movement as well as opening and closing of the grippers 132 is repeated so that the first workpart is next deposited at idle station $S_I$ by gripper 132-#3, then work station $S_2$ by gripper 132-#4 for forming the other (unformed) end and finally deposited by gripper 132-#5 in discharge chute 86. Of course, during this sequence, the second workpart is sequenced in succession to the turnaround station $S_T$, idle station $S_I$ and work station $S_2$. And, third, fourth and other workparts are sequenced in the same fashion continuously along the workpart flow path of the machine during continued operation in this manner with a workpart typically being at each station during such operation.

Of course, other modes of operation of the machine can be used, especially in the event only one end of the workpart is to be formed.

The above-described slide movements, gripper movements, and tool movements are controlled by a common programmable controller 150 programmable through control panel 152.

The front of the machine includes a transparent shield 160 as shown best in FIG. 2.

As used hereinabove and hereinafter in the claims, the description of the first and second pairs of forming tools as slidable in a direction is intended to mean that the tool pairs are slidable in the same general direction, such as in the longitudinal direction, as the spaced apart directional alignment of the first and second work stations, although as is apparent from the above description the individual tools (upper or lower for example) in each tool pair may slide in the opposite sense relative to one another such as leftward and rightward or toward and away from one another.

Although certain preferred features and embodiments of the invention have been described hereinabove and illustrated in the Figures, it is to be understood that modifications and changes may be made therein without departing from the spirit and scope of the invention as defined in the appended claims.

I claim:

1. A machine for forming workparts comprising a base, a first work station for rotatably supporting a first workpart and a second work station for rotatably supporting a second workpart with the first and second work stations being spaced apart in a direction on said base, first and second pairs of spaced, facing forming tools spaced apart in said direction on the base to cooperate with the respective first and second work stations and slidable substantially simultaneously in said direction in engagement with the respective first and second workparts rotatably supported at the respective work stations to form same, means for substantially simultaneously sliding the first and second pairs of forming tools, and workpart transfer means for positioning the first and second workparts at the respective work stations.

2. The machine of claim 1 which includes a load station, said first work station, said second work station and an unload station spaced apart longitudinally in succession on the base.

3. A machine for forming workparts comprising a base, a load station, first work station for rotatably supporting a first workpart, workpart turnaround station, second work station for rotatably supporting a second workpart and an unload station spaced apart in a direction on the base, first and second pairs of spaced, facing forming tools spaced apart in said direction on the base to cooperate with the respective first and second work stations and slidable substantially simultaneously in said direction in engagement with first and second workparts rotatably supported at the respective work stations to form same, means for substantially simultaneously sliding the first and second pairs of forming tools, and workpart transfer means movable in said direction relative to the stations and having multiple workpart grippers to transfer workparts successively from the load station to the first work station, second work station and the unload station.

4. A machine for roll forming workparts comprising a base, first and second work stations spaced apart in a direction on the base, said first and second work stations each comprising a spindle rotatably mounted on the base with a rotational axis generally transverse to the direction of spacing of said work stations and a tailstock rotatably mounted on the base with a generally transverse rotational axis substantially coaxial with that of the respective spindle for rotatably supporting a workpart therebetween generally transversely of said direction, a first and second pair of spaced, facing forming tools spaced apart in said direction on the base to cooperate with said first and second work stations and slidably mounted on the base for substantially simultaneous sliding movement in said direction in engagement with first and second workparts rotatably supported at the respective work stations, means for sliding said first and second pairs of forming tools substantially simultaneously in said direction in engagement with the respective first and second workparts, and means for positioning workparts between the spindle and tailstock at the first and second work stations, at least one of the spindles of said first and second work stations, the tailstocks of said first and second work stations and the workpart positioning means being movable transversely to the direction of spacing of said first and second work stations to position the first and second workparts at the respective first and second work stations between the respective first and second pairs of forming tools for engagement thereby when the forming tools are slid.

5. The machine of claim 4 wherein the spindles of said first and second work stations are fixed in position on the base in spaced apart alignment in said direction and the tailstocks of said first and second work stations are slidable transversely toward the respective spindles to rotatably support workparts therebetween and between said first and second pairs of forming tools.

6. The machine of claim 5 wherein the workpart positioning means is movable in said direction from the tailstock of the first work station to the tailstock of the second work station when the tailstocks are remote from the respective spindles.

7. A roll forming machine for forming workparts comprising a base, first and second rotatable spindles spaced longitudinally apart on the base along a first longitudinal path with a spindle rotational axis transverse to the first longitudinal path, a load station, first and second rotatable tailstocks and an unload station spaced apart longitudinally on the base along a second longitudinal line generally parallel with the first longitudinal path, said first and second tailstocks being spaced apart longitudinally to face the respective spindle and have their rotational axis align generally coaxially with the rotational axis of the respective spindle, first and second transverse slide means for slidably mounting the respective tailstocks for transverse movement from the second longitudinal path toward the respective spindle for rotatably supporting a workpiece therebetween, first and second pairs of forming tools spaced apart longitudinally and slidable longitudinally and substantially simultaneously in engagement with first and second workparts rotatably supported between the first spindle and tailstock and second spindle and tailstock to form same, means for substantially simultaneously sliding the first and second pairs of forming tools in engagement with the first and second workparts, and workpart transfer means movable along the second longitudinal path and having multiple workpart grippers to successively transfer workparts from the load station, to the first work station, second work station and unload station.

8. The machine of claim 7 wherein the machine includes a workpart turnaround station along the second longitudinal path between the first and second tailstocks for rotating the workpart.

9. The machine of claim 7 wherein the machine includes a workpart idle station along the second longitudinal path between the first and second tailstocks.

10. The machine of claim 7 wherein the load station comprises a pick-up position on a workpart load chute and the unload station comprises a discharge position on a workpart discharge chute.

11. The machine of claim 7 wherein the workpart transfer means comprises an overhead longitudinal member having said workpart grippers spaced apart longitudinally therealong, a compound slide assembly on the base slidably supporting the longitudinal member for movement longitudinally in increments along the second longitudinal path and movement vertically relative to the load station, first and second tailstocks and unload station, and cylinder means for moving the compound slide assembly.

12. The machine of claim 7 which includes first and second longitudinal tool slides with one forming tool of each of the first and second pairs of forming tools being mounted on the first longitudinal slide in longitudinal spaced relation and the other forming tool of each of the first and second pairs of forming tools being mounted on the second longitudinal slide in longitudinal spaced apart relation, said first and second longitudinal tool slides being slidable longitudinally toward and away from one another.

* * * * *